US008717416B2

(12) United States Patent
Russell et al.

(10) Patent No.: US 8,717,416 B2
(45) Date of Patent: May 6, 2014

(54) 3D CAMERA USING FLASH WITH STRUCTURED LIGHT

(75) Inventors: Andrew Ian Russell, Plano, TX (US); David Foster Lieb, Chicago, IL (US); Andrew Gerritt Huibers, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1526 days.

(21) Appl. No.: 12/241,040

(22) Filed: Sep. 30, 2008

(65) Prior Publication Data

US 2010/0079581 A1    Apr. 1, 2010

(51) Int. Cl.
*H04N 15/00* (2006.01)
*G06K 9/00* (2006.01)

(52) U.S. Cl.
USPC .............................................. 348/46; 382/154

(58) Field of Classification Search
USPC ............... 348/42–60; 382/154, 284; 359/376, 359/456, 462
See application file for complete search history.

(56) References Cited

U.S. PATENT DOCUMENTS

| | | | |
|---|---|---|---|
| 2004/0160590 A1* | 8/2004 | Koyagi et al. | 355/67 |
| 2007/0040921 A1* | 2/2007 | Davis et al. | 348/305 |
| 2008/0118143 A1* | 5/2008 | Gordon et al. | 382/154 |
| 2008/0231691 A1* | 9/2008 | Larson | 348/56 |
| 2009/0169109 A1* | 7/2009 | Grassmann et al. | 382/195 |

* cited by examiner

*Primary Examiner* — Lin Ye
*Assistant Examiner* — Mekonnen Dagnew
(74) *Attorney, Agent, or Firm* — Warren L. Franz; Wade J. Brady, III; Frederick J. Telecky, Jr.

(57) ABSTRACT

An imaging device capable of capturing depth information or surface profiles of objects is disclosed herein. The imaging device uses an enclosed flashing unit to project a sequence of structured light patterns onto an object and captures the light patterns reflected from the surfaces of the object by using an image sensor that is enclosed in the imaging device. The imaging device is capable of capturing an image of an object such that the captured image is comprised of one or more color components of a two-dimensional image of the object and a depth component that specifies the depth information of the object.

15 Claims, 5 Drawing Sheets

3D CAMERA USING FLASH WITH STRUCTURED LIGHT

TECHNICAL FIELD OF THE DISCLOSURE

The technical field of this disclosure relates to the art of three-dimensional imaging, and more particularly to the art of three-dimensional imaging using structured light.

BACKGROUND OF THE DISCLOSURE

There exist various techniques and systems for producing stereoscopic images. One type of approach uses triangulation methods to measure geometric attributes of an object in a scene for extracting depth information of the object. Another type of approach uses various scanning mechanism for measuring the time of flight so as to obtain the depth information of the object. Regardless of the method used, a key technique in three-dimensional imaging systems or stereoscopic imaging systems is the surface profile of the object or the depth information of the pixels at the surface of the object (hereafter the depth information). Once the surface profile or the depth information is obtained, a stereoscopic image of the object can be reconstructed.

Various techniques and devices for capturing surface profiles or depth information have been proposed. These techniques can be very costly, and the devices very large and not convenient for portability. As the drive for techniques and systems capable of stereoscopic imaging constantly grows in many industrial fields, the demand for cost-efficient and compact devices capable of capturing surface profile or depth information of objects likewise continually increases.

SUMMARY

In one example, a method is disclosed herein, the method comprising: capturing an image of an object using an image sensor that comprises an array of sensor pixels, wherein the captured image is comprised of a color component of a two-dimensional image of the object and a depth component, wherein the depth component specifies for at least one image pixel of the two-dimensional image a depth information that is the distance between a point of the object and a sensor pixel that generates the at least one image pixel.

In one example, a device is disclosed herein, the device comprising: an enclosure enclosed therein a flashing unit that comprises a spatial light modulator comprising an array of addressable pixels; and an image detection unit that comprises an image sensor comprising an array of light detection cells; and a shutter for synchronizing the flashing unit and the image detection unit.

In another example, a method for capturing an image of an object is disclosed herein, the method comprising: projecting a sequence of structured light patterns to the object using an array of micromirrors, wherein the consecutive light patterns are distanced apart by an interval that is 1 millisecond or less; capturing the light patterns reflected from the object; and extracting the depth information of the object from the captured light patterns.

In yet another example, a device is disclosed herein, the device comprising: an array of micromirrors, each micromirror comprising: a substrate; an electrode formed on the substrate; a mirror plate attached to a deformable hinge; and a mirror post holding the mirror plate and a deformable hinge above the substrate; and wherein a memory is absent from the micromirror.

DETAILED DESCRIPTION OF SELECTED EXAMPLES

Disclosed herein is a method of imaging an object such that the captured images can be used for producing three-dimensional (3D) images or stereoscopic images of the object. The method captures an image of the object such that the captured image comprises color components of a two-dimensional image of the object and a depth component that specifies the depth of the object. Image pixels having uncertain depth values can be assigned with a calculated value based upon known depth values of nearby image pixels. The color components of the two-dimensional image and the depth component can be used for producing three-dimensional images and stereoscopic images of the object. An image capturing device having the method implemented therein is provided. The image capturing device can be configured as a 3D camera that encloses a flashing unit and an image detector. The flashing unit is capable of projecting a train of structured light (rapid sequence of structured light patterns) to an object in a scene; and the image detector is capable of detecting the structured light reflected from the object in the scene. The structured light detected by the image detector can be analyzed so as to obtain the depth information of the object, which can be used to reconstruct the stereoscopic image of the object. An advantage of the imaging system is that such a 3D camera can be implemented in a compact point-and-shoot camera or a single-lens reflex camera by replacing the flash with a flashing unit in this disclosure.

The method and the imaging device are disclosed in the following with selected examples. It will be appreciated by those skilled in the art that the following discussion is for demonstration purposes and should not be interpreted as a limitation. Other variations within the scope of this disclosure are also applicable. In particular, the imaging method can be used with the imaging device; and can alternatively be used in other types of imaging devices or systems, and vice versa.

Figure 1:
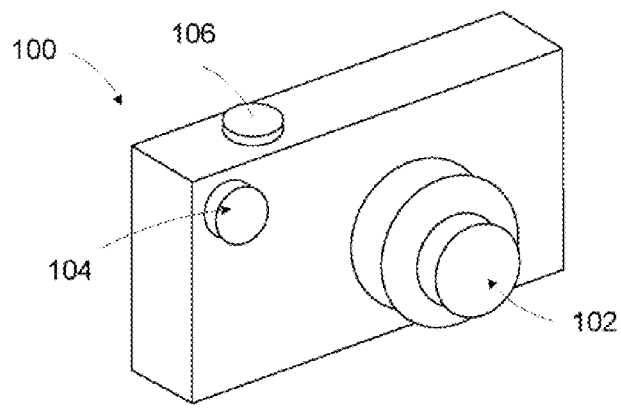
FIG. 1 diagrammatically illustrates an exemplary image capturing device that is capable of capturing depth information or surface profiles of objects.

Referring to the drawings, FIG. 1 diagrammatically illustrates an exemplary 3D camera of this disclosure. The 3D camera 100 comprises a flash unit 104, an image detection unit 102, and a shutter 106. The flashing unit is provided for generating structured light patterns with desired time characteristics and projecting the generated light patterns onto objects in a scene. The image detection unit is provided for capturing the structured light patterns reflected from the object during a suitable time period and converting the captured light patterns into desired electrical signals. The shutter 106 is provided for enabling the user to synchronize the flashing unit and the image detection unit.

In one example, the flashing unit and the image detector are substantially fixed within the 3D camera 100 so as to enable triangulation-based depth measurements. It is noted that functional members, especially optics of the flashing unit and the image detector, can be moved relatively during the operation. The movements of the optical elements during operation can be compensated for by algorithms that are implemented in, for example, a calibration or a data analysis module in the 3D camera.

The 3D camera can be configured to have a characteristic dimension the same as a typical portable imaging device, such as a standard point-and-shoot camera, a single-lens reflex camera, or a cell phone having imaging capability, or a personal digital assistant having imaging capability. In one example, the 3D camera has a maximum dimension (along the length, width, and height) of 50 cm or less, 20 cm or less, or 10 cm or less. In another example, the 3D camera has a maximum volume of 250 cm$^3$ or less, 100 cm$^3$ or less, or even 50 cm$^3$ or less. The 3D camera may have other suitable dimensions in other examples.

Figure 2:
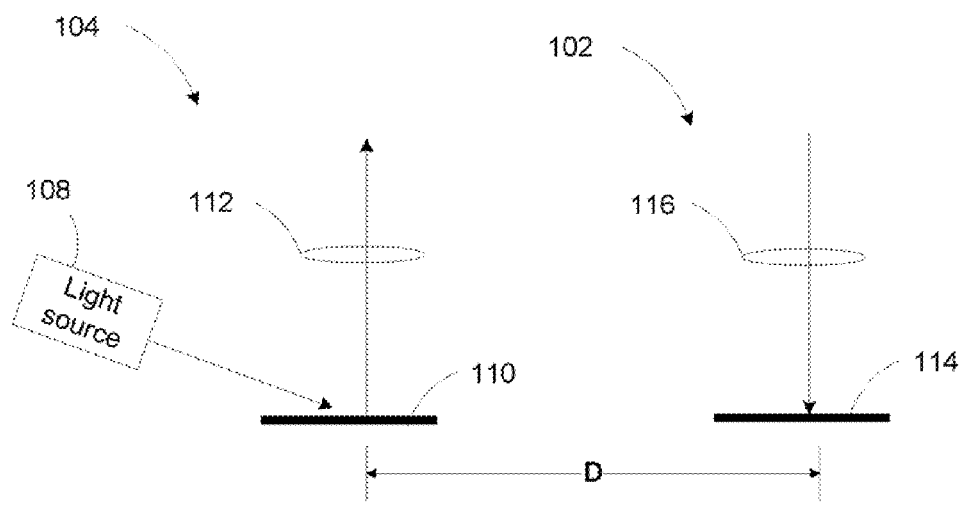
FIG. 2 is a diagram of an exemplary structure of the image capturing device in FIG. 1.

FIG. 2 diagrammatically illustrates a portion of the structure of the 3D camera in FIG. 1. For simplicity of presentation, other functional members are omitted from FIG. 2. In the example illustrated in FIG. 2, the flashing unit 104 of the 3D camera comprises an illumination system 108, a spatial light modulator 110, and a projection lens 112.

The illumination system 108 comprises one or more light sources for providing light. Various light sources can be used, such as light-emitting diodes (LEDs), arc lamps, devices employing free space or waveguide-confined nonlinear optical conversion and many other light emitting devices. In particular, light sources with low etendue, such as solid-state light emitting devices (e.g., lasers and light-emitting-diodes) can be used. When solid-state light emitting devices are used, the light source may comprise an array of solid-state light emitting devices capable of emitting different colors, such as colors selected from red, green, blue, and white. LEDs capable of emitting light in non-visible light ranges, such as infrared light range, can also be used in some examples. Exemplary laser sources are vertical cavity surface emitting lasers (VCSEL) and Novalux™ extended cavity surface emitting lasers (NECSEL), or any other suitable laser emitting devices.

Spatial light modulator 110 comprises an array of addressable pixels, such as deformable micromirrors and liquid-crystal-on-silicon (LCoS) cells. In other alternative examples, the spatial light modulator can be replaced by other types of light valves having addressable pixels, such as self-light emitting devices (e.g., plasma cells and organic light-emitting diodes). In those alternative examples, the illumination system 112 may not be necessary. Projection lens 112 collects light from spatial light modulator 114 and projects the collected light onto the object in scene.

The image detector 102 comprises an image sensor 114 and optics 116. The image sensor can be a charge-coupled device (CCD) array, complementary metal-oxide semiconductor (CMOS) sensor array, or other types of image sensors. The image sensor 114 is able to capture the light reflected from the object in scene and convert the captured optical signals into electrical signals.

In order to enable a triangulation measurement for depth information, the relative positions of spatial light modulator 110 and image sensor 114 in the 3D camera are preferably fixed. The distance D between the spatial light modulator 110 and the image sensor 114 is preferably as large as possible within the body of the 3D camera so as to increase the angular resolution of the 3D camera.

Figure 3:
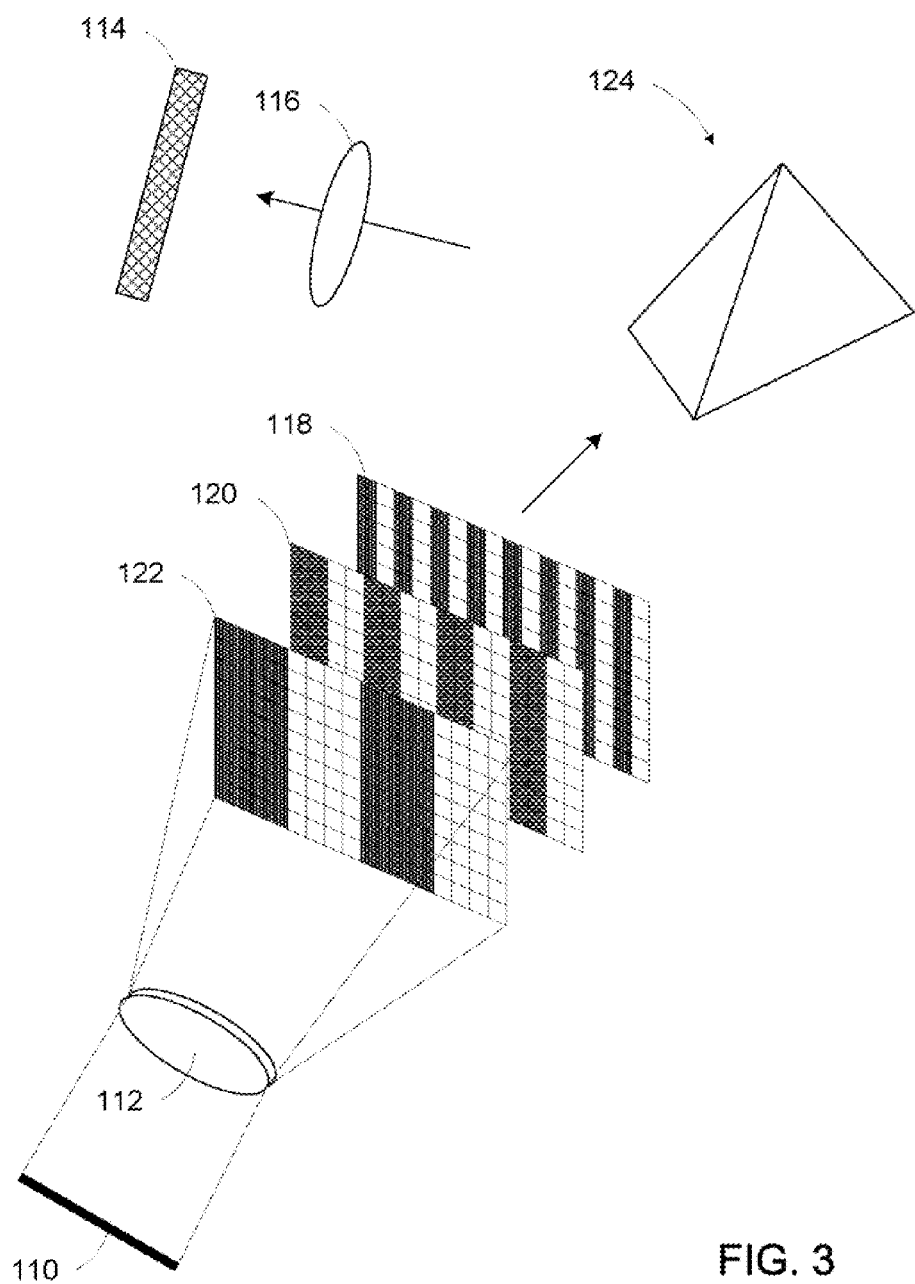
FIG. 3 diagrammatically illustrates a method of capturing depth information of an object in scene using the image capturing device of FIG. 1.

An exemplary method of capturing the depth information of a static object using the 3D camera is diagrammatically illustrated in FIG. 3. Referring to FIG. 3, a train of structured light patterns, such as patterns 118, 120, and 122 is generated by the flashing unit and projected onto static object 124 through spatial light modulator 110 and projection lens 112. The object 124 reflects the incident light patterns; and the image sensor 114 of the image detector captures the reflected light patterns through optics 116.

Various structured light patterns can be used, such as one-dimensional structured light (e.g., lines) and two-dimensional structured light (e.g., frames and grids). In the example as diagrammatically illustrated in FIG. 3, a train of light patterns is used with each light pattern carrying a binary code. Specifically, each light pattern comprises a set of "bright stripes" that are generated by the spatial light modulator pixels at the ON state (or the OFF state) and "dark stripes" that are generated by the spatial light modulator pixels at the OFF state (or the ON state). The bright and dark stripes are along the columns of image pixels; and can alternatively be along any desired directions, such as rows or diagonals or other directions.

The bright and dark stripes of the same kind have substantially the same width (along the direction perpendicular to the length of the stripe); while the stripes of different kinds (bright and dark stripes) may or may not have the same width even in the same light pattern or with the same code. For example, a bright stripe in a light pattern may have a different width than a dark stripe.

The bright and dark stripes alternate in a light pattern; and the distribution of the bright and dark stripes in a light pattern represents a binary code. For example, each of the bright and dark stripes in the light pattern (e.g., pattern 118) encoded with the least significant bit (LSB) has a width of one width unit (or a width of one of two different width units when the bright and the dark stripes have different width units). A width unit corresponds to one or more pixel columns of the pixel array in the spatial light modulator of the flashing unit in the 3D camera.

Each of the bright stripes of the light pattern (e.g., light pattern 120) encoded with the second binary bit (e.g., LSB+1) has a width of two width units of the bright stripes. In other words, each bright stripe in the second binary bit encoded light pattern 120 has a width that is substantially two times the width of the bright stripe in the light pattern 119 that is encoded with the LSB. Each dark stripe in the second binary bit encoded light pattern 120 has two width units of the dark stripes. It is noted that a bright stripe and a dark stripe in the light pattern may or may not have the same width.

Each of the bright stripes of the light pattern (e.g., light pattern 122) encoded with the third binary bit (e.g., LSB+2) has a width of three width units of the bright stripes; and each dark stripe has a width of three width units of the dark stripes, even though the dark stripe and the bright stripe may or may not have different widths.

The same encoding method is applied to all light patterns that are projected onto the object 124. It is noted that the binary coded light patterns can be projected to the object in any desired orders, such as increment order, decrement order, random order, or a user-defined order. Other than binary coding, other coding schemes such as linear coding schemes can also be used.

At the surface of the object 124, the bright and dark stripes of each light pattern may be deformed depending upon the surface profile of the object 124. The deformation in the reflected bright and dark stripes carries depth information of the surface that reflects the bright and dark stripes. The reflected light patterns having bright and dark stripes are captured by the image sensor 114 through optics 116 as shown in the figure.

The train of light patterns can have any suitable numbers of light patterns. In one example, a number of N light patterns can be selected such that the image pattern encoded with the most significant bit (MSB) binary code of a set of binary codes is comprised substantially of a bright stripe (or a dark stripe), wherein the binary codes is expressed as $2^{N-1}$.

The structured light patterns can be projected to the object in scene in any suitable schemes. For example, the light patterns can be projected at intervals that are substantially uniformly separated in time. Because a shorter measurement time necessary for obtaining the depth information can be critical for ensuring accurate depth information of moving objects, it is preferred that the time interval between consecutive light patterns is 10 milliseconds or less, 5 milliseconds or less, 1 millisecond or less, 500 microseconds or less, 200 microseconds or less, or even 100 microseconds or less. In fact shorter time periods, such as 50 microseconds or less, 30 microseconds or less, 10 microseconds or less, 5 microseconds or less, or even 1 microsecond or less, could also be used. Accordingly, each light pattern is preferably generated by the spatial light modulator in a time period that is 100 microseconds or less, such as 50 microseconds or less, 30 microseconds or less, 10 microseconds or less, 5 microseconds or less, or even 1 microsecond or less.

Because the light patterns are generated by pixels of the spatial light modulator or the pixels of the light valve, the switching time (e.g., the time of switching pixels switched between the ON and OFF states) predominantly determines the time properties of the light patterns. A shorter generation time of a light pattern and a shorter interval between consecutive light patterns can take advantage of reflective and deformable micromirrors that often exhibit short switching time.

Figure 4:
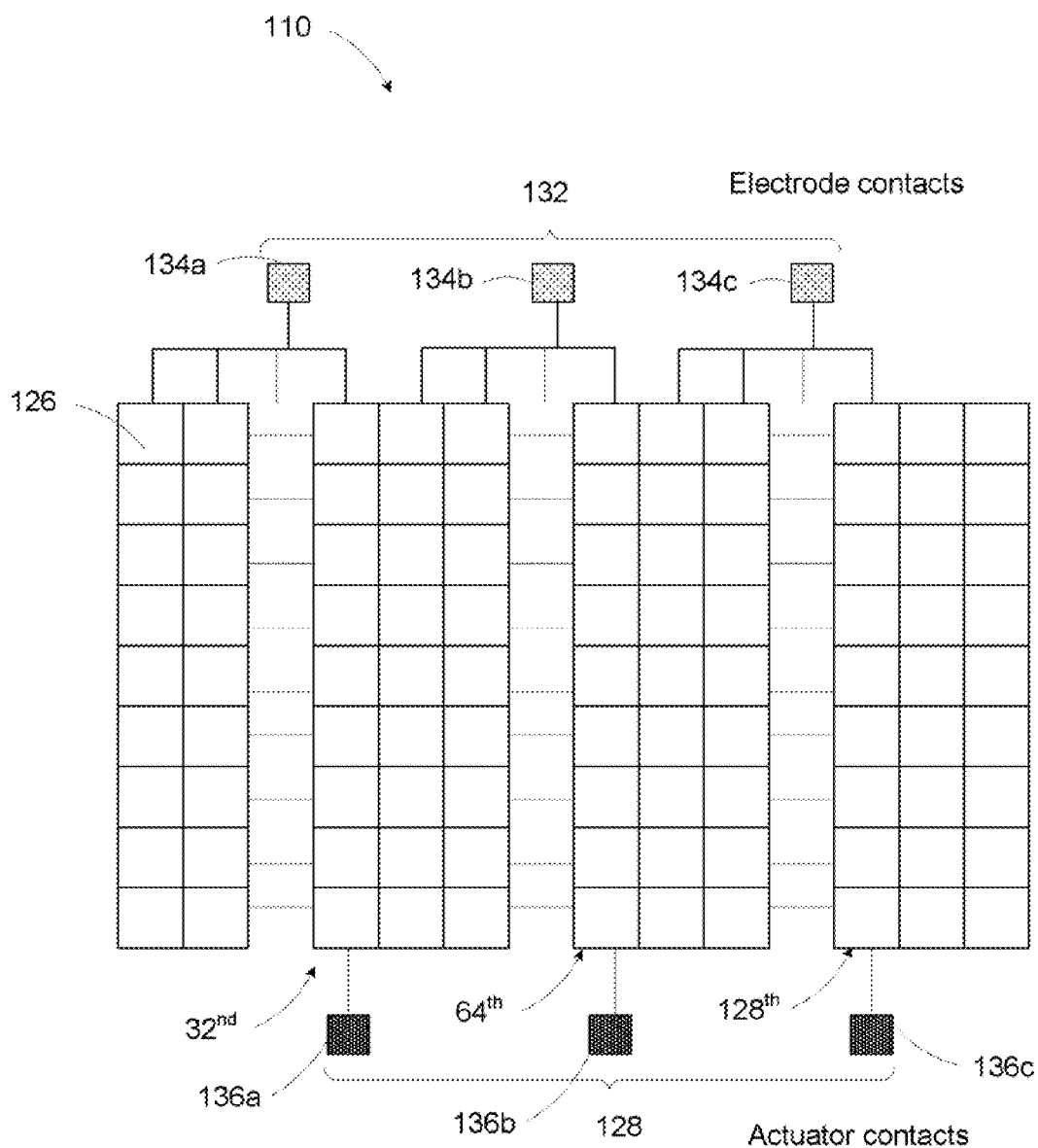
FIG. 4 diagrammatically illustrates an exemplary pixel array of the spatial light modulator in FIG. 2.

Various micromirrors can be used to generate the light patterns as discussed above, such as a DMD device available from Texas Instruments. Other types of micromirror arrays can also be used, such as the micromirror array diagrammatically illustrated in FIG. 4. Referring to FIG. 4, micromirror array 110 in this example comprises micromirrors, such as micromirror 126 that are deployed as an array. For demonstration purposes, 14×9 micromirrors are shown in the micromirror array. In fact, the micromirror array may comprise any desired numbers of micromirrors, which is referred to as the native resolution of the micromirror array. As an example, the micromirror array may have a resolution of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher, or integer multiples and fractions of these resolutions. Of course, other resolutions are also applicable.

Figure 5:
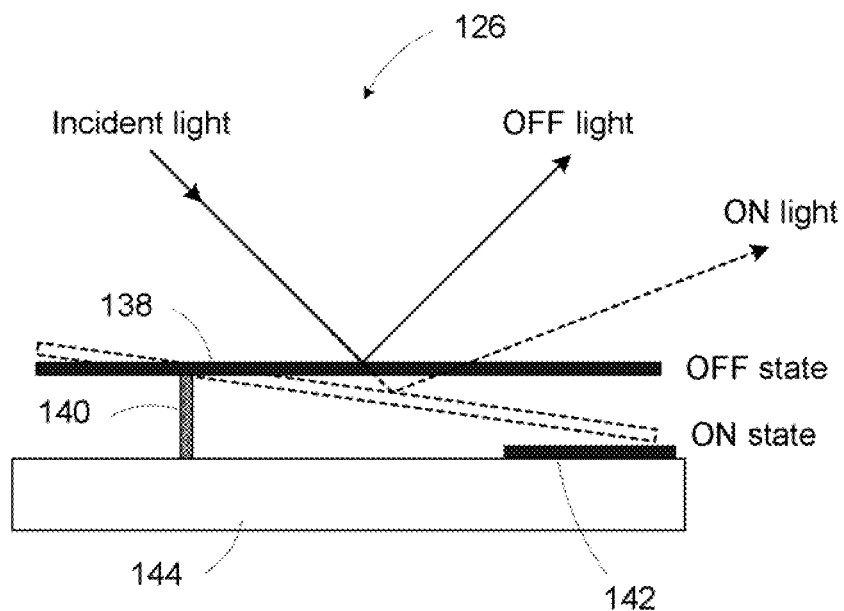
FIG. 5 is a cross-sectional view of an exemplary micromirror device that can be used in the spatial light modulator of FIG. 3.

Various types of micromirrors can be used in the micromirror array 110, one of which is diagrammatically illustrated in FIG. 5. Referring to FIG. 5, the micromirror 126 in this example comprises a substrate 144, an addressing electrode 142 that is formed on substrate 144, a mirror plate 138 that is attached to a deformable hinge, and a mirror post 140 that holds the mirror plate and the deformable hinge above the substrate such that the mirror plate is capable of moving relative to the substrate.

The substrate in this example can be comprised of any desired materials, such as glass, amorphous silicon, plastic materials, semiconductor materials, or many other materials. Electrode 142 is formed on a surface of the substrate and is electrically connected to an external source such that a voltage can be applied between the mirror plate 138 and the electrode 142. Unlike most existing micromirrors, micromirror 126 may not need a semiconductor device such as CMOS transistors or other types of memories (e.g., DRAM) to be formed on the substrate (144) or enclosed in the micromirror 126. Selection of the micromirror in the micromirror array and voltage application to the electrode (e.g., electrode 142) of a selected micromirror in the micromirror array can be accomplished through actuation contacts and electrode contacts that are connected to the micromirrors, which will be discussed afterwards with reference to FIG. 4.

The micromirror 126 in FIG. 5 has one single electrode 142. In operation, the mirror plate can be rotated towards the electrode 142 by a voltage between the mirror plate and the electrode; and stopped at an angle. The state of the mirror plate stopped at the angle can be defined as the ON state (or the OFF state) of the micromirror. During the rotation of the mirror plate towards the electrode 142, a mechanical restoration torque can be established in the deformable hinge to which the mirror plate is attached. When the voltage is removed or reduced below a threshold such that the torque from the voltage is not sufficient to overcome the mechanical torque in the deformable hinge, the mirror plate rotates back to its natural resting state under the mechanical restoration force. The natural resting state or a static state of the mirror plate can be defined as the OFF state (or the ON state).

A beam of light incident onto the mirror plate can be reflected by the mirror plate towards different directions. The light reflected by the mirror plate at the ON state is referred to as the ON-state light; and the light reflected by the mirror plate at the OFF-state is referred to as the OFF-state light. The ON-state light (or the OFF-state light) can be directed to the object to form a bright stripe; and the OFF-state light (or the ON-state light) can be directed away from the object to form a dark stripe.

The latching or hysteresis mechanism of the micromirror 126 as discussed above with reference to FIG. 5 can be used to set the state of M×N micromirror groups in a micromirror array (having M×N micromirrors or more than M×N micromirrors) using only M actuator contacts and N electrode contacts. For example in a 1024×768 micromirror array, M can be 32 and N can be 32 such that M×N is 1024. Every micromirror group (such as a single column or a row of micromirrors in the array) has a unique actuator connection and electrode connection. For example with reference to FIG. 5, a 1024×768 array of micromirrors 110 can be arranged such that: 1) the micromirrors in every $32^{nd}$ column are connected electrically (with part of the actuators, the mirror plate or the electrode); and 2) the electrodes in every group of 32 columns are connected electrically. Specifically, the micromirrors in the $32^{nd}$, $64^{th}$, and $128^{th}$ columns are electrically connected to actuator contacts 136a, 136b, and 136c, respectively. The electrodes of the micromirrors in first three groups of 32 columns are electrically connected to electrode contacts 134a, 134b, and 134c, respectively. With this configuration each column can be controlled independently; and 64 (32×2) total connections are sufficient to individually set the state of micromirrors in each column of the array. It is noted that the micromirror array can be configured with many other different groupings than 32 columns.

Because the selection of the micromirror in a micromirror array and activation (or switching state) of the micromirror array in the array can be accomplished by actuation contacts and electrode contacts, and memories in each individual micromirror of most current micromirror arrays can be avoided. As such, the micromirrors 126 and a micromirror array comprised of the micromirrors 126 can have reduced original design manufacture (ODM) cost, original equipment manufacture (OEM) cost, and bill of material (BOM) cost. An exemplary configuration of the micromirrors in an array is diagrammatically illustrated in FIG. 4.

Figure 6:
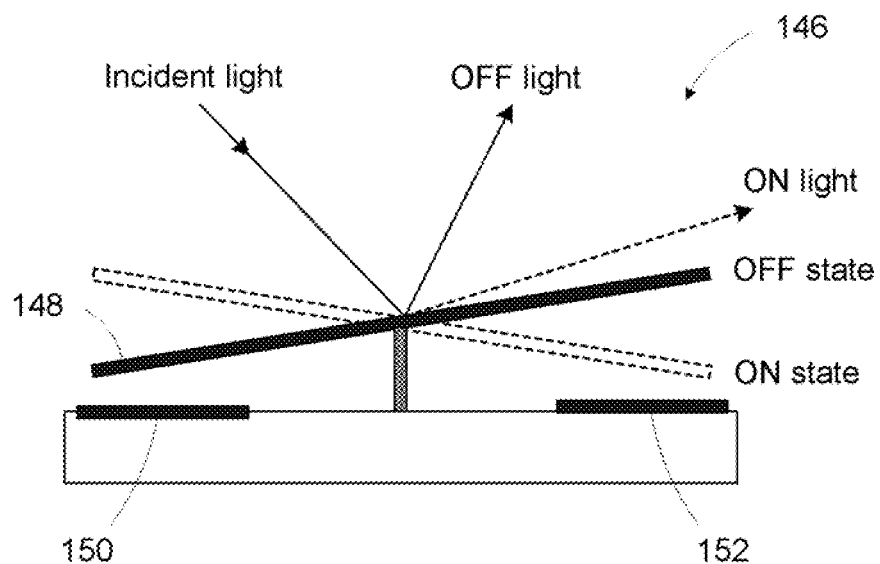
FIG. 6 is a cross-sectional view of another exemplary micromirror device that can be used in the spatial light modulator of FIG. 3.

Another exemplary micromirror is diagrammatically illustrated in FIG. 6. Referring to FIG. 6, micromirror 146 in this example comprises two electrodes 150 and 152 on the substrate. The electrodes are positioned at opposite sides of the mirror post that holds the mirror plate above the substrate. Driven by voltages applied to the electrodes 150 and 152, the mirror pate 148 rotates to the ON state and OFF state as shown in the figure. The substrate can be the same as that in micromirror 126 as discussed above with reference to FIG. 5.

Figure 7:
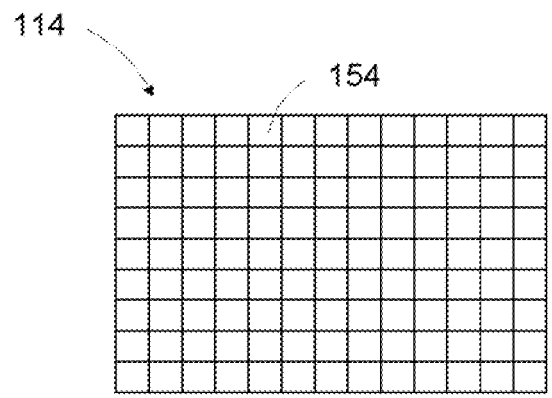
FIG. 7 is a diagram of an exemplary charge-coupled device that can be used in the image detector in FIG. 2.

The reflected light patterns from the object in scene are captured by the image sensor 114 through optics. One exemplary image sensor is diagrammatically illustrated in FIG. 7. Referring to FIG. 7, the image sensor 114 comprises an array of cells, such as cell 154. Various cells, such as charge-coupled devices (CCD) and complementary-metal-on-semiconductor (CMOS) diodes can be used in the image sensor.

A CCD cell typically comprises a photoactive region and a transmission region that is comprised of a shift register. A beam of light incident to the photoactive region of a CCD cell causes the accumulation of electric charge in a capacitor of the CCD cell. The amount of the electric charge accumulated is proportional to the intensity of the light incident onto the photoactive region. Once an array of CCD cells has been exposed to the incident light, a control circuit causes each capacitor to transfer its content to its neighboring capacitor. The last capacitor in the CCD cell array dumps its electric charge to a charge amplifier, which converts the electric charge into a voltage. By repeating this process, the controlling circuit converts the electric contents of the entire CCD cell array into a sequence of voltages. The sequence of voltages can then be stored.

In order to convert the train of reflected light patterns (e.g., N patterns) during period T (wherein T can be expressed as $T=N \times \Delta T$ and $\Delta T$ is the time distance between two consecutive light patterns) into a sequence of voltage signals, the CCD cells in the CCD array can be operated in many ways. In one example, N packets of electric contents are obtained and transferred (e.g., to an amplifier) for each CCD cell during time T. The transferred voltage signals for substantially all of N light patterns can be read out afterwards for analyses.

In another example, 1/N of the total CCD cells in the entire CCD array can be latched during time T for capturing N light patterns incident thereto during time T. The contents of the latched CCD cells can then be readout afterwards for analyses.

Figure 8:
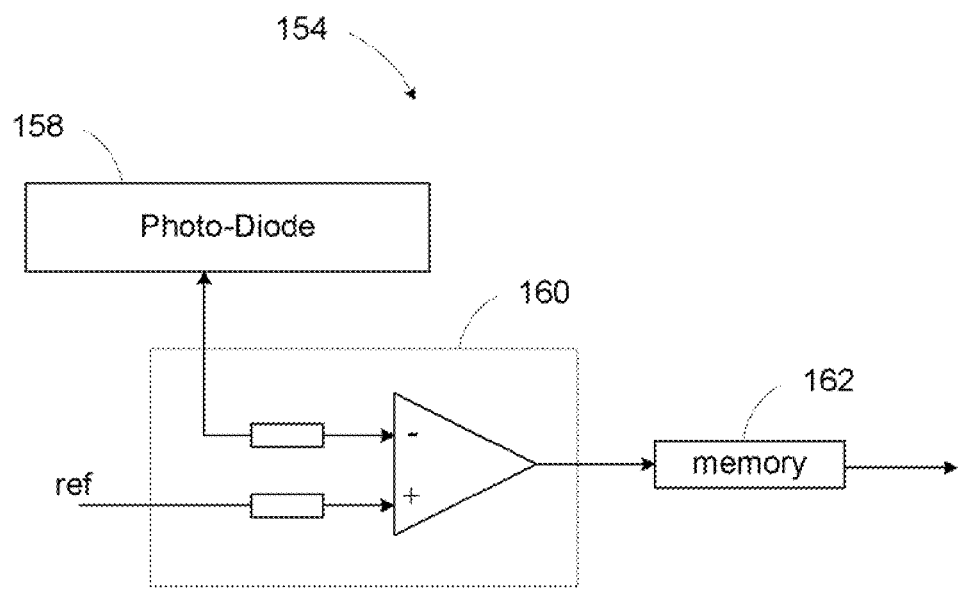
FIG. 8 diagrammatically illustrates the structure of an exemplary photo-detection pixel that can be used in the charge-coupled device in FIG. 7.

In yet another example, a comparator and a memory can be provided for each CCD cell in the array, as diagrammatically illustrated in FIG. 8. Referring to FIG. 8, the CCD cell in this example comprises a photodiode 158, comparator 160, and a memory 162. The photodiode 158 generates an amount of electric charge proportional to the intensity of the light incident thereto. The accumulated electric charge is delivered to the negative input of the comparator 160 that has a positive input being connected to a reference voltage signal. The output of the comparator 160 is connected to memory 162 such that the voltage signals from the comparator 160 can be stored in the memory 162. The content of the memory 162 can then be retrieved for analyses afterwards.

In capturing N light patterns reflected from the object in scene during time T, each CCD cell of the CCD array is exposed to the light patterns. The photodiode of each CCD cell causes accumulation of electric charge proportional to the intensity of the light incident thereto. The accumulated electric charge is transferred to the comparator; and the comparator converts the received electric charge into digital signals and stores the converted digital signals into the memory 162. The content in the memory 162 thus corresponds to the intensity of the light detected by the CCD cell; and carries the depth information of one or more points in the surface of the object. The contents in the memory can be analyzed for extracting the depth information of the object in scene afterwards, for example using existing depth information analysis algorithms.

Referring again to FIG. 3, the light patterns reflected from the object 124 are captured by the image sensor 114 so as to obtain the depth information of the object surface. In one example, the image sensor captures both two-dimensional image (e.g., components of a particular color space) and the depth information. Depending upon the color space used, the components of the two-dimensional image can be various, such as RGB, CMYK, YIQ, $YP_bP_r$, $YC_bC_r$, xvYCC, HSV, HSL, and other components. Each color component can be a two-dimensional array of pixel data with each pixel data corresponding to the intensity of a particular image pixel for the particular component. The depth information (or component) of a captured image can be a two-dimensional array of pixel data with each pixel data corresponding to a distance (depth) between a sensor pixel of the image sensor and a surface point at the surface of the object. Specifically, the depth component can be a J×K data array, wherein J×K is the dimension of the pixel array of the image sensor (e.g., the CCD array). A data value in (j, k) cell in the J×K data array of the depth component represents the distance between a surface point of the object being imaged and the image sensor pixel at location (j, k) in the sensor pixel array. The depth information in a captured image can thus be treated as an independent component of the captured image; and can be processed as other components. For example, the depth component can be compressed, stored, and/or processed as the other color components of the image.

In some situations, one or more portions of the object's surface being imaged may not be exposed to the image sensor from a certain observation angle. As a consequence, the image sensor may not be able to capture the light reflected from such hidden portion(s); and the depth information of the surface point(s) at such hidden portion(s) may not be obtained. This problem can be solved by, for example, data interpolation with any suitable interpolation techniques, such as linear interpolation, polynomial interpolation, spline interpolation and other techniques. In particular, the depth value of an image pixel corresponding to a hidden surface portion of the object can be obtained by interpolation based on the known values of the neighboring or nearby pixels. The interpolation can be performed before presenting a 3D image using the depth information or can be performed dynamically during the displaying of the 3D image.

In an exemplary 3D display operation, the image data, such as the color component of the 2D image and the depth component of each 2D image (or the depth component of each color component in each 2D image) are delivered to a display system. By default, as an example, the display system can show the image from the non-rotated view. In other words, the initial view of a 3D image can be identical to a 2D image of the object surface. The 3D image can be rotated by a user or by the display automatically so that the three-dimensional aspect becomes apparent due to the variation of the depth component. The rotated views can be generated from the 2D image and the depth component using an existing 3D image mapping technique.

Stereoscopic display can be performed by providing two images to the right and left eyes of a viewer; and the two images represent different perspectives of the same object. In one example, one of the two eyes of a viewer can be provided with a non-rotated view; while the other eye is provided with a slightly rotated view, e.g., a rotated view that deviates from the non-rotated view similar to the perspectives that both eyes of the viewer naturally received from the object surface. Alternatively, each eye can be provided with differently rotated views.

It will be appreciated by those of skill in the art that a new and useful imaging device capable of capturing depth information or surface profiles of objects have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method, comprising:
projecting a sequence of different structured light patterns onto an object using an array of addressable light modulating pixels of a spatial light modulator, wherein respective ones of the sequence are projected at time interval spacings; capturing a two-dimensional image of the object; and
capturing the light patterns reflected from the object as depth information for image pixels of the two-dimensional image; wherein the reflected light patterns are captured by an array of sensor pixels of an image sensor; and capturing the reflected light patterns includes latching a number P of sub-arrays of the sensor pixels at respective measurement times corresponding to the time interval spacings of a number N of the different structured light patterns, wherein P is equal to 1/N of a total number of sensor pixels in the sensor pixel array.

2. The method of claim 1, wherein the spatial light modulator and the image sensor are located in a common hand-portable structure.

3. The method of claim 2, wherein the light modulating pixel elements are micromirrors.

4. The method of claim 1, further comprising: producing a three-dimensional image of the object using the captured two dimensional image and captured reflections of the light patterns.

5. The method of claim 4, wherein producing the three-dimensional image comprises:
generating a displaced view two-dimensional image from the captured two-dimensional image using depth component information determined based on distortions of the projected light patterns detected in the captured reflections of the light patterns.

6. The method of claim 5, wherein the captured two-dimensional image and the generated displaced view two-dimensional image are displayed as respective left and right eye views to produce a stereoscopic image of the object.

7. The method of claim 1, wherein the light patterns are projected at time interval spacings of 200 microseconds or less.

8. The method of claim 1, wherein the array of sensor pixels is an array of charge-coupled device pixels.

9. The method of claim 1, wherein the different light patterns are respectively encoded with different encodings.

10. The method of claim 9, wherein the different encodings comprise encodings corresponding to different significance bits of a binary code.

11. The method of claim 9, wherein the light patterns are patterns of stripes.

12. The method of claim 11, wherein the stripes are generated by applying electrical signals to commonly electrically connected groupings of the light modulating pixels.

13. The method of claim 12, wherein the light modulating pixels are arranged in an array of rows and columns, with commonly electrically connected groupings of ones of the columns.

14. The method of claim 9, wherein the light patterns are patterns of stripes and the different encodings comprise different stripe widths.

15. The method of claim 14, wherein the different stripe widths have relative sizes corresponding to different significance bits of a binary code.

* * * * *